US010533677B2

(12) United States Patent
Sugiura et al.

(10) Patent No.: US 10,533,677 B2
(45) Date of Patent: Jan. 14, 2020

(54) LINEAR SOLENOID VALVE AND METHOD OF MANUFACTURING LINEAR SOLENOID VALVE

(71) Applicant: AISIN AW CO., LTD., Anjo-shi, Aichi-ken (JP)

(72) Inventors: Hironori Sugiura, Hekinan (JP); Takahiro Kokubu, Nishio (JP)

(73) Assignee: AISIN AW CO., LTD., Anjo (JP)

(*) Notice: Subject to any disclaimer, the term of this patent is extended or adjusted under 35 U.S.C. 154(b) by 0 days.

(21) Appl. No.: 15/743,891

(22) PCT Filed: Sep. 9, 2016

(86) PCT No.: PCT/JP2016/076602
§ 371 (c)(1),
(2) Date: Jan. 11, 2018

(87) PCT Pub. No.: WO2017/056919
PCT Pub. Date: Apr. 6, 2017

(65) Prior Publication Data
US 2018/0266581 A1   Sep. 20, 2018

(30) Foreign Application Priority Data
Sep. 30, 2015   (JP) ................... 2015-194539

(51) Int. Cl.
F16K 31/06   (2006.01)
F16K 11/07   (2006.01)
H01F 7/16    (2006.01)

(52) U.S. Cl.
CPC .......... F16K 31/0613 (2013.01); F16K 11/07 (2013.01); F16K 11/0716 (2013.01);
(Continued)

(58) Field of Classification Search
CPC .. F16K 31/0613; F16K 31/0675; F16K 11/07; F16K 11/0716; F16K 31/0679; H01F 7/16; H01F 7/1607
(Continued)

(56) References Cited

U.S. PATENT DOCUMENTS 4,250,922 A * 2/1981 Will ................... F16K 31/0613
                                                      137/625.65
4,919,390 A * 4/1990 Ichiryu ................. H01F 7/1607
                                                      251/129.15
(Continued)

FOREIGN PATENT DOCUMENTS

CN   101960191 A    1/2011
JP   2005-286234 A  10/2005
(Continued)

OTHER PUBLICATIONS

Nov. 22, 2016 International Search Report issued in International Patent Application No. PCT/JP2016/076602.

Primary Examiner — John Bastianelli
(74) Attorney, Agent, or Firm — Oliff PLC

(57) ABSTRACT

In a linear solenoid valve, a coil wound on a bobbin is disposed radially outside a first core and a second core of that configure a part of a core segment, and a cover portion is formed by filling the outer periphery of the coil with a resin material so that the coil and the core segment are integrally molded together. The first core includes a small diameter portion having an outside diameter r2 smaller than an outside diameter r1 of an outer tubular portion that is part of the second core and that is opposed to the coil, and a large diameter portion that has an outside diameter r3 larger than that of the small diameter portion. A space between the small diameter portion and the bobbin makes it less likely that the first core is pressed radially inward via the bobbin during formation of the cover portion.

10 Claims, 2 Drawing Sheets

(52) U.S. Cl.
CPC ...... *F16K 31/0675* (2013.01); *F16K 31/0679* (2013.01); *H01F 7/16* (2013.01); *H01F 7/1607* (2013.01)

(58) Field of Classification Search
USPC ............... 251/129.15; 137/625.65, 625.69
See application file for complete search history.

(56) References Cited

U.S. PATENT DOCUMENTS

| | | | | |
|---|---|---|---|---|
| 5,856,771 | A * | 1/1999 | Nippert | H01F 7/1607 251/129.15 |
| 6,527,249 | B2 * | 3/2003 | Niimi | F16K 31/0613 137/625.69 |
| 7,325,564 | B2 * | 2/2008 | Ryuen | F16K 11/0716 137/375 |
| 7,487,798 | B2 * | 2/2009 | Furuta | F16K 31/0613 137/625.65 |
| 2005/0218362 | A1 | 10/2005 | Furuta et al. | |
| 2009/0140189 | A1 | 6/2009 | Kokubu et al. | |
| 2009/0189105 | A1 | 7/2009 | Dayton | |
| 2016/0329143 | A1 | 11/2016 | Irie et al. | |

FOREIGN PATENT DOCUMENTS

| | | | |
|---|---|---|---|
| JP | 2009-127692 | A | 6/2009 |
| JP | 2011-216739 | A | 10/2011 |
| JP | 2015-119185 | A | 6/2015 |
| WO | 2015/115298 | A1 | 8/2015 |

* cited by examiner

LINEAR SOLENOID VALVE AND METHOD OF MANUFACTURING LINEAR SOLENOID VALVE

TECHNICAL FIELD

The present disclosure relates to a linear solenoid valve that uses a solenoid device to regulate an input oil pressure and output the resultant pressure, and also relates to a method of manufacturing the same.

BACKGROUND ART

One known linear solenoid valve (refer to Patent Document 1) includes the following: a spool inserted in a sleeve; a coil wound on an insulating bobbin; a plunger that drives the spool upon energization of the coil; a shaft that transmits a drive force of the plunger to the spool; a plunger core that slidably supports the plunger; and a shaft core that slidably supports the shaft. In the linear solenoid valve, the plunger core and the shaft core that are integrally formed with a non-magnetic annular member sandwiched therebetween and that are disposed radially inside the coil serves, in conjunction with a case that covers the outer periphery of the coil, to form a magnetic circuit that magnetically drives the plunger upon energization of the coil.

RELATED ART DOCUMENTS

Patent Documents

Patent Document 1: Japanese Patent Application Publication No. 2009-127692 (JP 2009-127692 A)

SUMMARY

Problem to be Solved

When a coil is disposed radially outside a core member in which a plunger core and a shaft core are integrally formed, as in the linear solenoid valve disclosed in Patent Document 1, it is common to assemble them by fitting, on the core member, a member in which the coil and a bobbin are integrally formed by resin molding or the like. In this case, to allow for tolerances of the core member and the bobbin in order to ensure assemblability, it is necessary that the outside diameter of the core member should be set smaller than the inside diameter of the bobbin. The clearance provided between the bobbin and the core member separates the coil and the core member away from each other and weakens the magnetic force accordingly. This requires increasing the size of the coil in order to ensure the thrust force of the plunger, thus making it difficult to reduce the size of the entire linear solenoid valve.

One approach to this issue may be to integrally mold a core member and a coil together by filling the outer periphery of the coil fitted on the core member with a resin material. This approach reduces the clearance between the coil and the core member, increases the magnetic force accordingly, and thus may make it possible to reduce the size of a linear solenoid valve.

However, if a bobbin is used that has a thick portion formed in the vicinity of a thin portion and that has a coil wound on the outer peripheral surface of the thin portion, the thin portion has lower rigidity than the thick portion. Thus, during formation of a resin layer on the outer periphery of the coil, a plunger core may be pressed radially inward through the coil and the thin portion of the bobbin by injection pressure of the resin material or by shrinkage of the injected resin material. For this reason, if such a large radially inward force is exerted on the plunger core, the slidability of the plunger may be degraded.

Therefore, a purpose of disclosed embodiment is to provide a linear solenoid valve capable of reducing the influence associated with forming a resin layer.

Means for Solving the Problem

A linear solenoid valve according to a preferred embodiment includes: a spool that slides inside a hollow cylindrical sleeve in an axial direction to cause valve opening and valve closing; a coil; a tubular bobbin including a thin portion having an outer peripheral surface on which the coil is wound, a thick portion larger in thickness than the thin portion, and an opening that is defined by inner peripheries of the thin portion and the thick portion and that faces in the axial direction; a movable element that is a magnetic member and that is driven to move in the axial direction upon energization of the coil so as to move the spool; a first stator that is a magnetic member, that is disposed radially inside the coil, and that supports the movable element slidably in the axial direction; a second stator that is disposed radially inside the coil and that is aligned with the first stator in the axial direction; and a resin layer formed on an outer periphery of the coil. In the linear solenoid valve, the second stator includes a supporting portion having an outer peripheral surface that supports an inner peripheral surface of the bobbin, the first stator includes a large diameter portion and a small diameter portion, the large diameter portion has an outer peripheral surface that supports an inner peripheral surface of the thick portion of the bobbin, the small diameter portion is located between the supporting portion and the large diameter portion in the axial direction and is at least partially smaller in outside diameter in a circumferential direction than the large diameter portion and the supporting portion, and at least a part of the small diameter portion in the axial direction overlaps the thin portion of the bobbin as seen from a radial direction so as to form a clearance between an outer peripheral surface of the small diameter portion and an inner peripheral surface of the thin portion.

On the other hand, a linear solenoid valve manufacturing method according to a preferred embodiment is a method of manufacturing a linear solenoid valve that includes: a spool that slides inside a hollow cylindrical sleeve in an axial direction to cause valve opening and valve closing; a coil; a tubular bobbin including a thin portion having an outer peripheral surface on which the coil is wound, and a thick portion larger in thickness than the thin portion; a movable element that is a magnetic member and that is driven to move in the axial direction upon energization of the coil so as to move the spool; a first stator that is a magnetic member and that supports the movable element slidably in the axial direction; and a second stator aligned with the first stator in the axial direction. The method includes: a core forming step of integrally forming the first stator and the second stator such that a part of the first stator in the axial direction is formed as a large diameter portion, such that another part of the first stator that is located closer to the second stator than the large diameter portion in the axial direction is formed as a small diameter portion, such that a part of the second stator is formed as a supporting portion, and such that an outside diameter of the small diameter portion is at least partially smaller in a circumferential direction than each of an outside diameter of the large diameter portion and an outside diameter of the supporting portion; a coil disposing step of disposing the coil radially outside the first stator and the second stator such that an inner peripheral surface of the bobbin is supported by an outer peripheral surface of the supporting portion, such that an inner peripheral surface of the thick portion of the bobbin is supported by an outer peripheral surface of the large diameter portion, and such that at least a part of the coil in the axial direction overlaps the small diameter portion so as to form a clearance between an outer peripheral surface of the small diameter portion and an inner peripheral surface of the thin portion of the bobbin; and a resin layer forming step of forming a resin layer by filling an outer periphery of the coil with a non-magnetic resin material.

According to this linear solenoid valve, since the coil, the first stator, and the second stator are integrally formed together by forming the resin layer on the outer periphery of the coil, clearances between the coil and each of the first stator and the second stator become small, as compared to, for example, when a coil integrated with a resin member is fitted on the first stator and the second stator. Further, the inner peripheral surface of the bobbin is supported by the large diameter portion of the first stator and the supporting portion of the second stator, and the small diameter portion that is smaller in outside diameter than each of the large diameter portion and the supporting portion is located so as to be opposed to the coil. As such, the space between the bobbin and the small diameter portion is usable to lessen the force in a diameter decreasing direction that is exerted on the coil during formation of the resin layer, thus reducing the influence associated with forming the resin layer.

BEST MODES

Below, a linear solenoid valve 1 according to the present embodiment is described with reference to the drawings. The linear solenoid valve 1 may form part of a hydraulic circuit of an automatic transmission when attached to a non-illustrated valve body and may be used, for example, as a direct linear solenoid valve that receives, as input, a line pressure regulated by a regulator value in accordance with a throttle opening and that supplies an output pressure directly to a hydraulic servo inside the automatic transmission.

[Valve Section]

Figure 1:
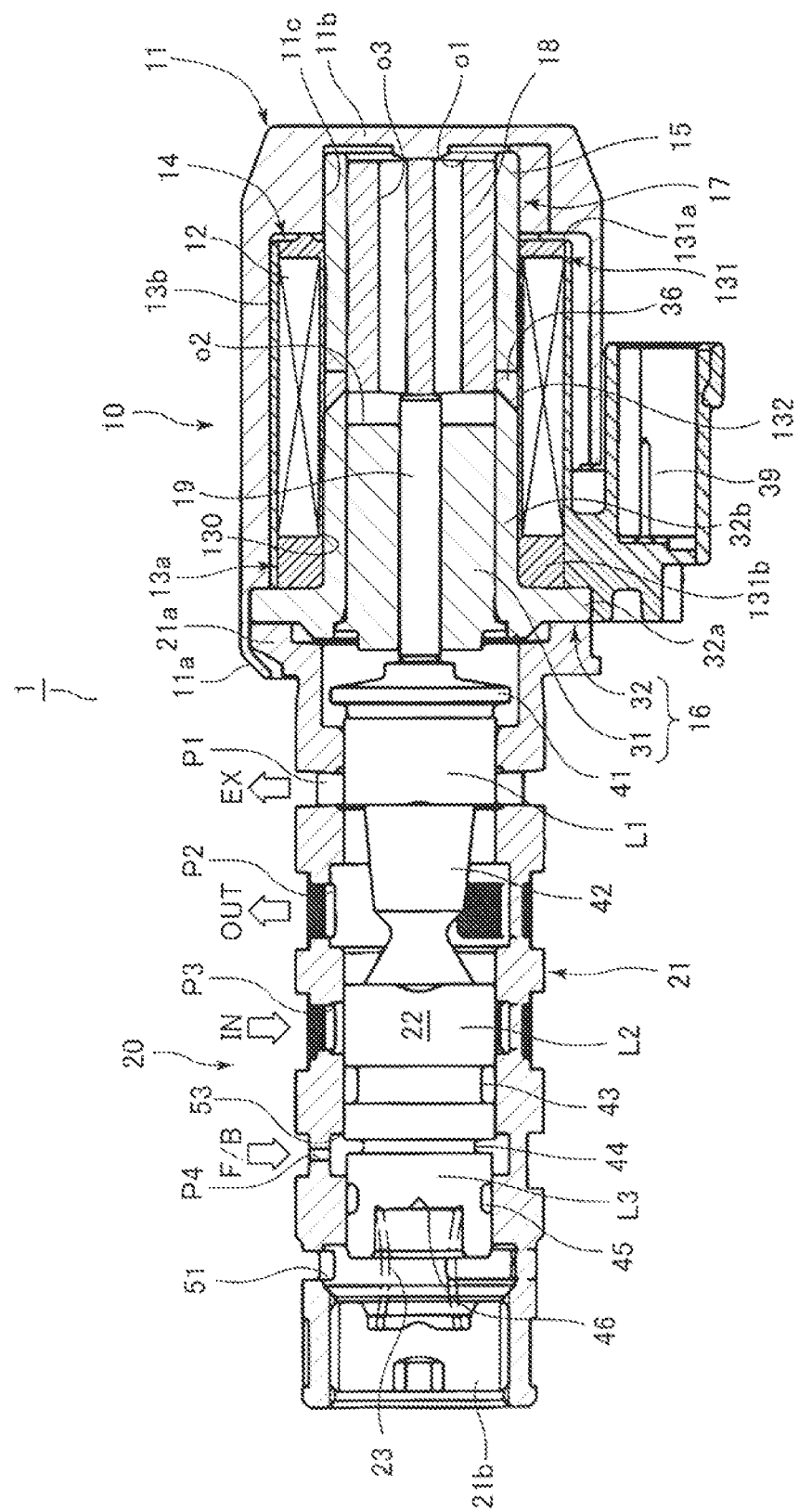
FIG. 1 is a cross-sectional view of a linear solenoid valve according to an embodiment of the present disclosure.

As illustrated in FIG. 1, the linear solenoid valve 1 broadly includes a solenoid section 10 and a valve section 20. The valve section 20 includes the following: a hollow cylindrical sleeve 21 having multiple ports communicable with an oil passage of a valve body; a spool 22 that slides inside the sleeve 21 in an axial direction to cause valve opening and valve closing; and a spring 23 disposed between the sleeve 21 and the spool 22.

The sleeve 21 has, formed therein, a drain port P1, an output port P2, an input port P3, a feedback port P4, and a discharge hole 51, in order closest to the valve section 20 first. Out of these, the input port P3 receives input pressures including a line pressure, and the output port P2 outputs an output pressure that has been regulated inside the valve section 20. The output port P2 and the feedback port P4 communicate with each other via the oil passage inside the valve body.

The spool 22 that is slidably supported with respect to the sleeve 21 has, as land portions in sliding contact with the sleeve 21, a first land L1, a second land L2, and third land L3, in order closest to the solenoid section 10 first, and these are joined together by small diameter portions 42 and 44 to form an integral member having a substantially cylindrical shape. An end of the spool 22 that is close to the solenoid section 10 in the axial direction is an abutment portion 41 that abuts against a shaft 19 of the solenoid section 10.

The spring 23 is disposed and compressed between a recess 46 formed in the other end of the spool 22 opposite to the abutment portion 41 and an end cap 21b that forms the bottom of the sleeve 21, thus biasing the spool 22 toward the solenoid section 10 in the axial direction. The linear solenoid valve 1 is a so-called normally closed solenoid valve, and in a de-energized state (in the state shown in FIG. 1) where the solenoid section 10 is supplied with no electric power, the biasing force of the spring 23 maintains the spool 22 in a position (a valve closing position) that interrupts communication between the input port P3 and the output port P2.

The first land L1 establishes communication between the output port P2 and the drain port P1 in the valve closing position and interrupts communication between the output port P2 and the drain port P1 by moving in the axial direction from the valve closing position toward the end cap 21b. The second land L2 interrupts communication between the input port P3 and the output port P2 in the valve closing position and establishes communication (valve opening) between the input port P3 and the output port P2, by moving in the axial direction from the valve closing position toward the end cap 21b, in such a manner that the size of the opening between the input port P3 and the output port P2 is adjustable to allow an output pressure from the output port P2 to increase or decrease in proportion to electric power supplied to the solenoid section 10.

The second land L2 and the third land L3 are aligned in the axial direction across the small diameter portion 44 and serves in conjunction with an inner peripheral wall of the sleeve 21 to form a feedback oil chamber 53. The third land L3 is smaller in diameter than the second land L2. Thus, when oil pressure is supplied to the feedback oil chamber 53 through the feedback port P4, a difference in pressure receiving area between the second land L2 and the third land L3 generates a biasing force that biases the spool 22 in the axial direction toward the solenoid section 10.

It is noted that oil leaked out of the feedback oil chamber 53 through a clearance between the third land L3 and the sleeve 21 is discharged through the discharge hole 51. Further, the second land L2 and the third land L3 respectively have annular oil grooves 43 and 45 extending in a circumferential direction. These oil grooves 43 and 45 make it possible for oil pressure that has been input through the input port P3 or the feedback port P4 and that has been distributed unevenly in the circumferential direction to be evenly distributed in the circumferential direction through a clearance between the sleeve 21 and the second land L2 or the third land L3, thus allowing an improvement in slidability of the spool 22.

[Solenoid Section]

As illustrated in FIG. 1, the solenoid section 10 includes the following: a coil assembly 14 having a coil 12, a bobbin 13a, a cover portion 13b, a core segment 17, and a terminal portion 39; a plunger 18, the shaft 19, and a housing 11. Out of these, a first core 15 and a second core 16 of the core segment 17, the plunger 18, and the housing 11 are magnetic members; whereas the bobbin 13a, the cover portion 13b, a non-magnetic portion 36 of the core segment 17, and the shaft 19 are non-magnetic members. The housing 11 is a case member and covers the outside of the coil assembly 14, thus serving as an outer shell of the solenoid section 10. Each of the plunger 18 and the shaft 19 is disposed inside the coil assembly 14 and is concentric with the spool 22.

The core segment 17 of the coil assembly 14 is structured such that the first core 15 and the second core 16 are integrally formed with the non-magnetic portion 36 that is sandwiched therebetween and that is made of a non-magnetic material, such as a copper brazing material. The first core 15 that is a first stator is located radially inside the coil 12 and is a cylindrical member disposed concentrically with the plunger 18. The plunger 18 is supported on the inner peripheral surface of the first core 15 slidably in the axial direction. The second core 16 that is a second stator is a tubular member disposed concentrically with the shaft 19 and is aligned with the first core 15 in the axial direction. The shaft 19 is supported on the inner peripheral surface of the second core 16 slidably in the axial direction.

The bobbin 13a is a substantially cylindrical (tubular) member made of a non-magnetic material, such as resin. The bobbin 13a has a thin portion 132 in the middle and has a thick portion 131 larger in thickness than the thin portion 132 at each end in an opening direction thereof. Specifically, the thin portion 132 and the thick portion 131 have the same inner diameter, whereas the outside diameter of the thick portion 131 is larger than the outside diameter of the thin portion 132. The thick portion 131 includes a first thick portion 131a that is disposed on the same side (the right side in the drawing) as the first core 15 with respect to the second core 16 in the axial direction, and a second thick portion 131b that is disposed on the opposite side of the thin portion 132 from the first thick portion 131a. A wire is wound on an outer peripheral surface of the thin portion 132 so as to form the coil 12. The bobbin 13a, with the coil 12 supported thereon, is disposed radially outside the core segment 17 such that an opening 130 thereof faces in the axial direction. The cover portion 13b is a resin layer that is formed by tightly filling the outer the peripheries of the coil 12 and the bobbin 13a with a resin material. The coil 12 disposed radially outside the core segment 17 is embedded in a resin member formed by the non-metallic bobbin 13a and the non-metallic cover portion 13b so that the core segment 17 and the coil 12 are integrally joined to form the coil assembly 14.

The plunger 18 that is a movable element is disposed in a cylindrical space formed by the core segment 17 and a bottom 11b of the housing 11 and serves in conjunction with the housing 11 to form a first oil chamber o1 therebetween and in conjunction with the second core 16 to form a second oil chamber o2 therebetween. The plunger 18 has, formed therein, an oil hole o3 that establishes communication between the first oil chamber o1 and the second oil chamber o2. The shaft 19 that is a shaft-like member is shaped in the form of a cylinder smaller in diameter than the plunger 18 and is disposed between the spool 22 and the plunger 18 in the axial direction. The shaft 19 is pressed toward the plunger 18 by the spool 22 that is biased by the spring 23, thus abutting against the plunger 18 at one end in the axial direction and abutting against the abutment portion 41 of the spool 22 at the other end in the axial direction.

The second core 16 includes a cylindrical core member 31 having an inner peripheral surface in sliding contact with the shaft 19, and a flange-like flange member 32 that is disposed radially outside the core member 31 and that is integral with the core member 31. The flange member 32 includes the following: an outer tubular portion 32b that extends along an outer peripheral surface of the core member 31 serving as a core portion and that is joined to the non-magnetic portion 36 at one end in the axial direction; and a rim portion 32a that extends in a radial direction from the other end of the outer tubular portion 32b in the axial direction. The outside diameter of the core member 31 is substantially equal to the outside diameter of the plunger 18, and the thickness of the core member 31 is substantially equal to a difference in outside diameter between the plunger 18 and the shaft 19.

The housing 11 is cylinder-shaped (cup-shaped) with one closed end in the axial direction and houses the coil assembly 14 inside. An open end 11a of the housing 11 is swaged so as to cover an end 21a of the sleeve 21 that is abutted against the rim portion 32a of the flange member 32. Thus, since the sleeve 21 is fixed to the housing 11 with the coil assembly 14 pressed against the housing 11, the coil assembly 14 is fixed to the housing 11, and the solenoid section 10 and the valve section 20 are assembled together.

The terminal portion 39 is disposed at a location protruding outward in the radial direction from the housing 11 part of which in the circumferential direction is cut off, and is integrally molded with the cover portion 13b by use of a resin material. The terminal portion 39 is allowed to supply electric power (feed electric power) to the coil 12 when connected to a power source via a connector and a transformer.

[Detailed Structure of Coil Assembly]

Next, the detailed structure of the coil assembly 14 is described. As illustrated in the cross-sectional view of FIG. 2, the coil assembly 14 has a layered structure including, in order from radially inside out, the core segment 17, the bobbin 13a, the coil 12, and the cover portion 13b. One end of the coil 12 in the axial direction and a portion (a supporting portion 11c) of the housing 11 sandwich the first thick portion 131a of the bobbin 13a therebetween, and the other end of the coil 12 in the axial direction and the rim portion 32a of the flange member 32 sandwich the second thick portion 131b of the bobbin 13a therebetween. Thus, the first core 15, the housing 11, the second core 16, and the plunger 18 are disposed sequentially around the coil 12 and form a magnetic circuit that generates a magnetic force upon energization of the coil 12.

The first core 15 and the second core 16 of the core segment 17 are joined together such that an end surface 15c of the first core 15 and an end surface (an inclined surface 32e) of the outer tubular portion 32b of the second core 16 are brazed together, at a location overlapping the coil 12 in the axial direction, by the non-magnetic portion 36 that is a non-magnetic metal material (a brazing material). An inner peripheral surface 15a of the first core 15 and an inner peripheral surface 32c of the outer tubular portion 32b of the second core 16 have the same inside diameter and are smoothly joined via the non-magnetic portion 36 so as to form a sliding contact surface for the plunger 18.

The outer tubular portion 32b of the second core 16 has a tapered portion 32T that is located adjacent to the non-magnetic portion 36 and that is tapered so as to decrease in outside diameter toward the end surface 15c of the first core 15. Specifically, the inclined surface 32e of the tapered portion 32T extends, in the shape of a cone with a central axis coincident with a central axis O1 of the core segment 17, from an inner end T1 equal in diameter to the inner peripheral surface 32c of the outer tubular portion 32b to an outer end T2 equal in diameter (r1) to an outer peripheral surface 32*d* of the outer tubular portion 32*b*. In the cross section illustrated in FIG. 2, the inclined surface 32*e* (the outer peripheral surface) inclined inward from the outer peripheral surface 32*d* in the radial direction and the inner peripheral surface 32*c* extending in the axial direction cause the tapered portion 32T to have a single edged knife shape with the edged inner end T1 directed to the first core 15.

The first core 15 includes a small diameter portion 15A having an outside diameter r2 smaller than an outside diameter r1 (the maximum outside diameter) of the outer tubular portion 32*b*, and a large diameter portion 15B that is integral with the small diameter portion 15A and that has an outside diameter r3 larger than that of the small diameter portion 15A. The position of the small diameter portion 15A in the axial direction overlaps the coil 12. In other words, the first core 15 includes the small diameter portion 15A that is located radially inside the coil 12 and that has a thickness h2 smaller than a thickness h1 of the outer tubular portion 32*b* (h1>h2), and the large diameter portion 15B that has a thickness h3 larger than that of the small diameter portion 15A (h2<h3) and that extends from the small diameter portion 15A in the axial direction.

The small diameter portion 15A is opposed to the coil 12 such that the thin portion 132 of the bobbin 13*a* is interposed therebetween, and the large diameter portion 15B faces the first thick portion 131*a* of the bobbin 13*a*. The diameter of the inner peripheral surface of the bobbin 13*a* is constant over the first thick portion 131*a*, the second thick portion 131*b*, and the thin portion 132, and is substantially equal to each of the outside diameter r3 of the large diameter portion 15B of the first core 15 and the outside diameter r1 of the outer tubular portion 32*b* of the second core 16. Thus, the inner peripheral surface of the bobbin 13*a* is in contact with and supported by the outer peripheral surface of the outer tubular portion 32*b* and an outer peripheral surface of the large diameter portion 15B both of which serve as a supporting portion, and is separated away from the small diameter portion 15A at least before filling (injection molding) of the cover portion 13*b*.

The large diameter portion 15B extends beyond the bobbin 13*a* in the axial direction, abuts against the bottom 11*b* of the housing 11, and is fitted in an annular supporting portion lie raised from the bottom 11*b*. As such, the large diameter portion 15B of the first core 15 is in contact at an outer peripheral surface 15*b* with the inner peripheral surface of the bobbin 13*a* and the supporting portion 11*c*, thus being supported by the housing 11 that is fixed to the valve body or the like and by the bobbin 13*a* that is fixed in position with respect to the housing 11.

[Linear Solenoid Valve Manufacturing Process]

The linear solenoid valve 1 described above is manufactured by a manufacturing process including the following steps.

In a core forming step, the core segment 17 is integrally formed by sandwiching the non-magnetic portion 36 between the first core 15 and the second core 16, the small diameter portion 15A having the outside diameter r2 smaller than the outside diameter r1 of the outer tubular portion 32*b* of the second core 16 is formed on the first core 15, and the large diameter portion 15B having the outside diameter r3 larger than that of the small diameter portion 15A is formed on the first core 15. In a coil disposing step, the coil 12 is disposed radially outside the core segment 17 such that the inner peripheral surface of the bobbin 13*a* is in contact with the outer peripheral surfaces of the outer tubular portion 32*b* and the large diameter portion 15B and such that at least a part of the coil in the axial direction overlaps the small diameter portion 15A. In a resin layer forming step, a non-metallic resin material is injected (injection molding) to fill a space between a mold and the coil 12 that has been fixed in position with respect to the core segment 17 in the coil disposing step and is then hardened so that the cover portion 13*b* is formed on the outer periphery of the coil 12.

The coil assembly 14 that has been integrally molded through the core forming step, the coil disposing step, and the resin layer forming step is mounted inside the housing 11 along with the plunger 18 and the shaft 19 so that the solenoid section 10 is formed. The solenoid section 10 and the valve section 20 are integrally assembled to form the linear solenoid valve 1.

During injection of the resin material in the resin layer forming step, an inward molding pressure (injection pressure) in the radial direction is exerted on the coil 12 and the bobbin 13*a*. Further, when the injected cover portion 13*b* is cooled and shrunk, the coil 12 and the bobbin 13*a* are pressed inward in the radial direction. In the related art, the first core 15 is in contact with the inner peripheral surface of the bobbin 13*a* at both the thin portion 132 and the thick portion 131 of the bobbin 13*a* in the axial direction. Thus, when such an inward force in the radial direction (in a diameter decreasing direction) is exerted, a large force in the diameter decreasing direction may be exerted on a part of the first core 15 that is in contact with the thin portion 132 that is thinner than the thick portion 131. Therefore, to allow for the possibility that the first core 15 is pressed by the bobbin 13*a*, the outside diameter of the plunger 18 needs to be set smaller than the inside diameter of the first core 15 so that there is a little larger clearance between the plunger 18 and the first core 15. However, as the separation distance between the plunger 18 and the first core 15 increases, the magnetic efficiency of the magnetic circuit decreases, and the magnetic force exerted on the plunger 18 is weakened accordingly. This requires, for example, increasing the size of the coil in order to ensure the thrust force of the plunger 18, thus making it difficult to reduce the size of the linear solenoid valve.

As a solution to this issue, according to the present embodiment, the outside diameter r2 of the small diameter portion 15A that is part of the first core 15 and that is opposed to the coil 12 is smaller than the outside diameter r1 of the outer tubular portion 32*b* that is part of the second core 16 and that is opposed to the coil 12, and is also smaller than the outside diameter r3 of the large diameter portion 15B. In other words, at least before the resin material is injected, there is a clearance between the small diameter portion 15A and the inner peripheral surface of the bobbin 13*a*.

As such, if the thin portion 132 of the bobbin 13*a* is deformed inward in the radial direction by a force exerted thereon in the diameter decreasing direction during molding of the cover portion 13*b*, the clearance between the outer peripheral surface of the small diameter portion 15A and the inner peripheral surface of the thin portion 132 accommodates the deformation of the thin portion 132, thereby preventing exertion of a large force in the diameter decreasing direction on the small diameter portion 15A. This reduces the influence caused by the molding pressure exerted during injection of the resin material for forming the cover portion 13*b* and the influence caused by the cooling shrinkage. Further, compared to, for example, when the outside diameter of the first core 15 is equal to the outside diameter of the outer tubular portion 32*b* over the entire length thereof, the influence of the molding pressure on the first core 15 is reduced. This allows the outside diameter of the plunger 18 to be set closer to the inner diameter of the first core 15 in order to increase the magnetic force to be exerted on the plunger 18, thus making it possible to reduce the size of the whole linear solenoid valve while ensuring the thrust force of the plunger 18.

Figure 2:
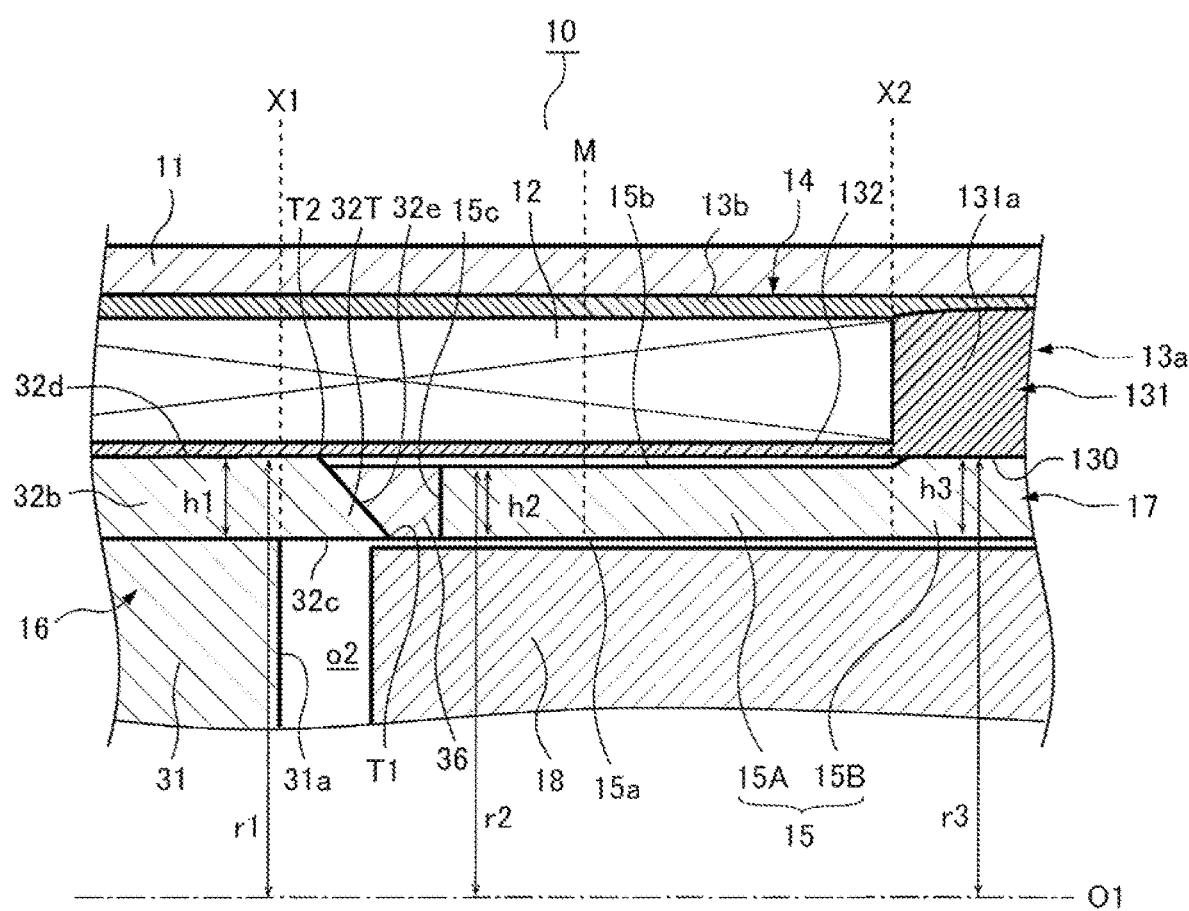
FIG. 2 is a partially enlarged view of FIG. 1 and schematically illustrates the cross section.

In particular, when the outer tubular portion 32*b* of the second core 16 is supported from inside in the radial direction by the core member 31 as illustrated in FIG. 2, it can be considered that the thin portion 132 that is pressed by the cover portion 13*b* becomes deformed between the following positions X1 and X2: a connection position X1 (i.e., the boundary of a region where the outer tubular portion 32*b* is supported by the core member 31) where a first-core-side (the right side in the drawing) side surface 31*a* of the core member 31 in the axial direction is connected to the inner peripheral surface 32*c* of the outer tubular portion 32*b*; and an end position X2 where a second-core-side (the left side in the drawing) end of the first thick portion 131*a* supported by the large diameter portion 15B of the first core 15 and having higher rigidity than the thin portion 132 is located. For this reason, it is preferable that the small diameter portion 15A be formed over an area including a middle position M (a midpoint between X1 and X2) between the connection position X1 and the end position X2 of the first thick portion 131*a*. Preferably, the small diameter portion 15A may be formed to extend in the axial direction toward the second core from the end position X2. More preferably, the small diameter portion 15A may be formed to extend in the axial direction toward the first thick portion (to the right in the drawing) from a position where a second-core-side end of the first core 15 is located. In particular, when the non-magnetic portion 36 is provided between the first core 15 and the second core 16, the outside diameter of the non-magnetic portion 36 may be preferably set equal to the outside diameter r2 of the small diameter portion 15A. Since the shaft 19 is smaller in diameter than the plunger 18, the second core 16 is larger in thickness than the first core 15 at least within the region where the outer tubular portion 32*b* is supported by the core member 31, and thus is less likely to be affected by the molding pressure than the first core 15.

[Valve Opening and Valve Closing by Energization Control]

Next, the operation of the linear solenoid valve 1 structured as described above is described. As already described, when the coil 12 is de-energized, the biasing force of the spring 23 maintains the spool 22 in the valve closing position. Since communication between the input port P3 and the output port P2 is interrupted by the second land L2 of the spool 22; whereas communication between the output port P2 and the drain port P1 is established, oil pressure in the oil passage connected to the output port P2 is discharged through the drain port P1. At this time, the plunger 18 is pressed against the spool 22 via the shaft 19 and is thus abutted against the bottom 11*b* of the housing 11.

When the coil 12 is energized, magnetic flux passing through the magnetic circuit of the solenoid section 10 induces an attractive force (a thrust force) that attracts the plunger 18 in the axial direction toward the second core 16. This attractive force changes in accordance with the magnitude of current flowing through the coil 12. Thus, when the electric power supplied to the coil 12 increases, the plunger 18 is driven to move in the axial direction toward the valve section 20 against the biasing force from the spool 22. The spool 22 then pressed by the plunger 18 via the shaft 19 slides from the valve closing position in the axial direction against the biasing force (a resilient force) of the spring 23, thereby interrupting communication between the output port P2 and the drain port P1 and establishing communication between the input port P3 and the output port P2 inside the sleeve 21 (a valve opening state).

When the valve section 20 is in the valve opening state, oil pressure output from the output port P2 is supplied to the feedback port P4 through an external oil passage so that a biasing force that biases the spool 22 toward the solenoid section 10 is generated in the feedback oil chamber 53. Thus, the spool 22 moves, in accordance with changes in the electric power supplied to the solenoid section 10 and the input pressure to the input port P3, to a position where the drive force from the plunger 18 balances the sum of the biasing force of the spring 23 and the biasing force in the feedback oil chamber 53. As such, in accordance with the magnitude of electric power supplied to the coil 12, the valve section 20 is controlled so as to be opened and closed, and the degree of the opening in the valve section 20 is controlled so that a suitably regulated output pressure is output from the output port P2. When the supply of electric power to the coil 12 is interrupted, the spool 22 returns immediately to the valve closing position by the biasing force of the spring 23 and by the biasing force in the feedback oil chamber 53.

It is noted here that the coil 12 and the core segment 17 of the solenoid section 10 are integrally formed together as the coil assembly 14 by the cover portion 13*b* that is formed by injecting a resin material. Thus, for example, compared to a solenoid section that is structured such that an integral member formed by winding a coil on a bobbin is fitted on the outer periphery of a core member, it is possible to reduce the clearance between the core segment 17 and the coil 12 in order to improve the magnetic efficiency of the magnetic circuit.

Further, as already described, the outside diameter r2 of the small diameter portion 15A that is part of the first core 15 and that is opposed to the coil 12 is set smaller than each of the outside diameter r3 of the large diameter portion 15B and the outside diameter r1 of the outer tubular portion 32*b* that is part of the second core 16 and that is opposed to the coil 12, in order to prevent exertion of a large force in the diameter decreasing direction on the first core 15 during integral molding of the coil assembly 14. This allows the outside diameter of the plunger 18 to be set closer to the inside diameter of the first core 15 so that the magnetic force exerted on the plunger 18 is increased, thus making it possible to reduce the size of the whole linear solenoid valve while ensuring the thrust force of the plunger 18.

Further, the second core 16 that forms part of the magnetic circuit of the solenoid section 10 has the tapered portion 32T that is located adjacent to the non-magnetic portion 36 and that is tapered so as to decrease in outside diameter in the axial direction toward the first core 15. As illustrated in FIG. 2, with the plunger 18 moved toward the first core 15 in the axial direction (with the plunger 18 moved to a position corresponding to the de-energized state), the inner peripheral surface 32*c* of the tapered portion 32T extends to a location that overlaps the outer peripheral surface of the plunger 18 as seen from the radial direction. Thus, when the coil 12 is energized, a magnetic circuit is formed that allows the magnetic flux concentrated in the tapered portion to pass through a facing region between the tapered portion 32T and the plunger 18. This exerts a strong magnetic force on the plunger 18, thereby improving the responsiveness of the solenoid section 10. The end of the plunger 18 that is close to the second core 16 does not move beyond the inner end T1 of the tapered portion 32T. This prevents the members from being caught on each other, thus improving the operational stability of the solenoid section 10.

Further, the maximum outside diameter of the inclined surface 32e (the outer peripheral surface) of the tapered portion 32T, namely the outside diameter of the outer end T2, is set larger than the outside diameter r2 of the small diameter portion 15A of the first core 15 and is set equal to the maximum outside diameter (r1) of the outer peripheral surface 32d of the outer tubular portion 32b. Thus, the magnetic flux passing through the outer periphery of the outer tubular portion 32b of the second core 16 is concentrated in the plunger 18 through the tapered portion 32T. This improves the magnetic efficiency, thus allowing further size reduction.

Further, the non-magnetic portion 36 is made of a metal material and brazes the end surface 15c of the first core 15 to the inclined surface 32e that is an end surface of the second core 16. This facilitates making the maximum outside diameter of the inclined surface 32e of the tapered portion 32T equal to the maximum outside diameter (r1) of the outer peripheral surface 32d as described above, thus facilitating forming the core segment 17 such that the magnetic efficiency is improved.

Other Embodiments

The valve section 20 of the linear solenoid valve 1 is not limited to a normally-closed type and may be a normally-open type that establishes communication between an input port and an output port in a de-energized state.

The first core 15 and the second core 16 are not limited to being integrally formed with the non-magnetic portion 36 sandwiched therebetween, and may, for example, be a member formed of only a magnetic material. The non-magnetic portion 36 is not limited to the structure described above. For example, an annular member made of a non-magnetic material, such as stainless steel, may be joined to each of the first core 15 and the second core 16 by brazing, press-fit, or the like.

Summary of the Present Embodiment

A linear solenoid valve (1) according to the present embodiment includes: a spool (22) that slides inside a hollow cylindrical sleeve (21) in an axial direction to cause valve opening and valve closing; a coil (12); a tubular bobbin (13a) including a thin portion (132) having an outer peripheral surface on which the coil (12) is wound, a thick portion (131) larger in thickness than the thin portion (132), and an opening (130) that is defined by inner peripheries of the thin portion (132) and the thick portion (131) and that faces in the axial direction; a movable element (18) that is a magnetic member and that is driven to move in the axial direction upon energization of the coil (12) so as to move the spool; a first stator (15) that is a magnetic member, that is disposed radially inside the coil (12), and that supports the movable element (18) slidably in the axial direction; a second stator (16) that is disposed radially inside the coil (12) and that is aligned with the first stator (15) in the axial direction; and a resin layer (13b) formed on an outer periphery of the coil (12). In the linear solenoid valve (1), the second stator (16) includes a supporting portion (32b) having an outer peripheral surface that supports an inner peripheral surface of the bobbin (13a), the first stator (15) includes a large diameter portion (15B) and a small diameter portion (15A), the large diameter portion (15B) has an outer peripheral surface that supports the inner peripheral surface the tick portion of the bobbin (13a), the small diameter portion (15A) is located between the supporting portion (32b) and the large diameter portion (15B) in the axial direction and is at least partially smaller in outside diameter in a circumferential direction than the large diameter portion (15B) and the supporting portion (32b), and at least a part of the small diameter portion (15A) in the axial direction overlaps the thin portion (132) as seen from a radial direction so as to form a clearance between an outer peripheral surface of the small diameter portion (15A) and an inner peripheral surface of the thin portion (132).

According to this linear solenoid valve, since the coil, the first stator, and the second stator are integrally formed together by forming the resin layer on the outer periphery of the coil, clearances between the coil and each of the first stator and the second stator become small, as compared to, for example, when a coil integrated with a resin member is fitted on the first stator and the second stator. Further, the inner peripheral surface of the bobbin is supported by the large diameter portion of the first stator and the supporting portion of the second stator, and the small diameter portion that is smaller in outside diameter than the large diameter portion and the supporting portion is located so as to face the thin portion of the bobbin. As such, a space between the bobbin and the small diameter portion is usable to lessen a force in the diameter decreasing direction that is exerted on the coil during formation of the resin layer, thus reducing the influence associated with forming the resin layer.

Preferably, in the linear solenoid valve (1) according to the present embodiment, the second stator (16) may have a core portion (31) disposed radially inside the supporting portion (32b), the thick portion (131) of the bobbin (13a) may include a first thick portion (131a) supported by the large diameter portion (15B) and a second thick portion (131b) that is disposed on the opposite side of the thin portion (132) from the first thick portion (131a) in the axial direction and that is supported by the supporting portion (32b), and the small diameter portion (15A) may be formed to extend in the axial direction toward the second stator (16) from where (X2) an end of the first thick portion (131a) that is close to the second stator (16) in the axial direction is located.

According to this structure, for the thin portion that is located between the first thick portion supported by the large diameter portion and the second thick portion supported by the supporting portion and that has lower rigidity than these thick portions, the small diameter portion is provided at least in the vicinity of the first thick portion. This reduces the likelihood of the first core being affected by the thin portion that is pressed inward in the radial direction in the vicinity of the first thick portion during formation of the resin layer.

Preferably, in the linear solenoid valve (1) according to the present embodiment, the small diameter portion (15A) may be formed to extend in the axial direction toward the first thick portion (131a) from where an end of the first stator (15) that is close to the second stator (16) in the axial direction is located.

According to this structure, the small diameter portion is formed to extend toward the first thick portion from where the end of the first stator that is close to the second stator is located. This reduces the likelihood of the first core being affected by the thin portion that is pressed inward in the radial direction in the vicinity of the position where the end of the first stator is located during formation of the resin layer.

Preferably, in the linear solenoid valve (1) according to the present embodiment, the supporting portion (32b) may extend closer to the first stator than the core portion (31) in the axial direction, the small diameter portion (15A) may be formed over an area including a middle position (M) between a connection position (X1) and an end position (X2) in the axial direction, the connection position (X1) is where a side surface (31a) of the core portion (31) that is close to the first stator in the axial direction is connected to an inner peripheral surface (32c) of the supporting portion (32b), and the end position (X2) is where the end of the first thick portion (131a) that is close to the second stator (16) in the axial direction is located.

According to this structure, the small diameter portion is formed so as to include the middle portion between the position where the supporting portion of the second stator is supported by the core portion, and the first thick portion that is supported by the large diameter portion of the first stator and that has higher rigidity than the thin portion. As such, since the small diameter portion is disposed where the amount of deformation of the thin portion may be large during formation of the resin layer, the influence associated with forming the resin layer is effectively reduced.

Preferably, the linear solenoid valve (1) according to the present embodiment may further include a non-magnetic portion (36) that is non-magnetic and that is disposed between the first stator (15) and the second stator (16) in the axial direction. In the linear solenoid valve (1), the small diameter portion (15A) may be formed all around in the circumferential direction, an outside diameter of the non-magnetic portion (36) may be equal to an outside diameter (r2) of the small diameter portion (15A), the supporting portion (32b) may have a tapered portion (32T) with an inner peripheral surface (32c) and an outer peripheral surface (32e) that form a tapered shape, the inner peripheral surface (32c) of the tapered portion (32T) is slidably contactable with an outer peripheral surface of the movable element (18), the outer peripheral surface (32e) of the tapered portion (32T) is inclined so as to decrease in outside diameter toward the first stator (15) in the axial direction, and with the movable element (18) moved toward the first stator (15) in the axial direction, the inner peripheral surface (32c) of the tapered portion (32T) may extend in the axial direction to a location that overlaps the outer peripheral surface of the movable element (18) as seen from the radial direction.

According to this structure, when the coil is energized with the movable element moved toward the first stator, a magnetic circuit is formed that causes the magnetic flux concentrated in the tapered portion to pass through a facing region between the tapered portion and the movable element. This exerts a strong magnetic force on the movable element, thereby improving the device responsiveness.

A linear solenoid valve manufacturing method according to the present embodiment is a method of manufacturing a linear solenoid valve that includes: a spool (22) that slides inside a hollow cylindrical sleeve (21) in an axial direction to cause valve opening and valve closing; a coil (12); a tubular bobbin (13a) including a thin portion (132) having an outer peripheral surface on which the coil (12) is wound, a thick portion (131) larger in thickness than the thin portion (132), and an opening (130) that is defined by inner peripheries of the thin portion (132) and the thick portion (131) and that faces in the axial direction; a movable element (18) that is a magnetic member and that is driven to move in the axial direction upon energization of the coil (12) so as to move the spool (22); a first stator (15) that is a magnetic member and that supports the movable element (18) slidably in the axial direction; and a second stator (16) aligned with the first stator (15) in the axial direction. The method includes: a core forming step of integrally forming the first stator (15) and the second stator (16) such that a part of the first stator (15) in the axial direction is formed as a large diameter portion (15B), such that another part of the first stator (15) that is located closer to the second stator (16) than the large diameter portion (15B) in the axial direction is formed as a small diameter portion (15A), such that a part of the second stator (16) is formed as a supporting portion (32b), and such that an outside diameter of the small diameter portion (15A) is at least partially smaller in a circumferential direction than each of an outside diameter of the large diameter portion (15B) and an outside diameter of the supporting portion (32b); a coil disposing step of disposing the coil (12) radially outside the first stator (15) and the second stator (16) such that an inner peripheral surface of the bobbin (13a) is supported by an outer peripheral surface of the supporting portion (32b), such that an inner peripheral surface of the thick portion (131) of the bobbin (13a) is supported by an outer peripheral surface of the large diameter portion (15B), and such that at least a part of the coil (12) in the axial direction overlaps the small diameter portion (15A) so as to form a clearance between an outer peripheral surface of the small diameter portion (15A) and an inner peripheral surface of the thin portion (132) of the bobbin (13a); and a resin layer forming step of forming a resin layer (13b) by filling an outer periphery of the coil (12) with a non-magnetic resin material.

According to this manufacturing method, by the core forming step, the coil disposing step, and the resin layer forming step, the coil, the first stator, and the second stator are integrally formed so that the magnetic efficiency of the linear solenoid valve is improved, and also the clearance is formed between the small diameter portion of the first stator and the thin portion of the bobbin so as to prevent exertion of a large force in a diameter decreasing direction on the first stator during formation of the resin layer.

INDUSTRIAL APPLICABILITY

The linear solenoid valve according to the present invention and the linear solenoid valve manufactured by the manufacturing method according to the present invention can be used for any type of fluid control device including hydraulic control devices used in drive devices of vehicles, for example.

DESCRIPTION OF THE REFERENCE NUMERALS

1: LINEAR SOLENOID VALVE
11: CASE MEMBER (HOUSING)
12: COIL
13a: BOBBIN
13b: RESIN LAYER (COVER PORTION)
15: FIRST STATOR (FIRST CORE)
15A: SMALL DIAMETER PORTION
15B: LARGE DIAMETER PORTION
15b: OUTER PERIPHERAL SURFACE
16: SECOND STATOR (SECOND CORE)
18: MOVABLE ELEMENT (PLUNGER)
19: SHAFT-LIKE MEMBER (SHAFT)
21: SLEEVE
22: SPOOL
36: NON-MAGNETIC PORTION
31: CORE PORTION (CORE MEMBER)
32b: SUPPORTING PORTION (OUTER TUBULAR PORTION)

32T: TAPERED PORTION
32c: INNER PERIPHERAL SURFACE
32e: OUTER PERIPHERAL SURFACE (INCLINED SURFACE)
130: OPENING
131: THICK PORTION
131a: FIRST THICK PORTION
131b: SECOND THICK PORTION
132: THIN PORTION
r1, r2, r3: OUTSIDE DIAMETER.

The invention claimed is:

1. A method of manufacturing a linear solenoid valve, the linear solenoid valve comprising: a spool that slides inside a hollow cylindrical sleeve in an axial direction to cause valve opening and valve closing; a coil; a tubular bobbin including a thin portion having an outer peripheral surface on which the coil is wound, and a thick portion larger in thickness than the thin portion; a movable element that is a magnetic member and that is driven to move in the axial direction upon energization of the coil so as to move the spool; a first stator that is a magnetic member and that supports the movable element slidably in the axial direction; and a second stator aligned with the first stator in the axial direction, the method comprising:

a core forming step of integrally forming the first stator and the second stator such that a part of the first stator in the axial direction is formed as a large diameter portion, such that another part of the first stator that is located closer to the second stator than the large diameter portion in the axial direction is formed as a small diameter portion, such that a part of the second stator is formed as a supporting portion, and such that an outside diameter of the small diameter portion is at least partially smaller in a circumferential direction than each of an outside diameter of the large diameter portion and an outside diameter of the supporting portion;

a coil disposing step of disposing the coil radially outside the first stator and the second stator such that an inner peripheral surface of the bobbin is supported by an outer peripheral surface of the supporting portion, such that an inner peripheral surface of the thick portion of the bobbin is supported by an outer peripheral surface of the large diameter portion, and such that at least a part of the coil in the axial direction overlaps the small diameter portion so as to form a clearance between an outer peripheral surface of the small diameter portion and an inner peripheral surface of the thin portion of the bobbin; and a resin layer forming step of forming a resin layer by filling an outer periphery of the coil with a non-magnetic resin material.

2. A linear solenoid valve comprising:
a spool that slides inside a hollow cylindrical sleeve in an axial direction to cause valve opening and valve closing;
a coil;
a tubular bobbin including a thin portion having an outer peripheral surface on which the coil is wound, a thick portion larger in thickness than the thin portion, and an opening that is defined by inner peripheries of the thin portion and the thick portion and that faces in the axial direction;
a movable element that is a magnetic member and that is driven to move in the axial direction upon energization of the coil so as to move the spool;
a first stator that is a magnetic member, that is disposed radially inside the coil, and that supports the movable element slidably in the axial direction;
a second stator that is disposed radially inside the coil and that is aligned with the first stator in the axial direction; and
a resin layer formed on an outer periphery of the coil, wherein
the second stator includes a supporting portion having an outer peripheral surface that supports an inner peripheral surface of the bobbin, and having a tapered portion formed at an end portion on the first stator side in the axial direction, an outside diameter of the tapered portion decreasing toward the first stator in the axial direction,
the first stator includes a large diameter portion and a small diameter portion,
the large diameter portion has an outer peripheral surface that supports an inner peripheral surface of the thick portion of the bobbin,
the small diameter portion is located between the supporting portion and the large diameter portion in the axial direction and is at least partially smaller in outside diameter in a circumferential direction than the large diameter portion and the supporting portion, and
the small diameter portion is formed from an end position on a second stator side of the thick portion of the bobbin toward the second stator side in the axial direction and at least a part of the small diameter portion in the axial direction overlaps the thin portion of the bobbin as seen from a radial direction so as to form a clearance between an outer peripheral surface of the small diameter portion and an inner peripheral surface of the thin portion from the end position on the second stator side of the thick portion of the bobbin toward the second stator side in the axial direction.

3. The linear solenoid valve according to claim 2, wherein
the second stator has a core portion disposed radially inside the supporting portion,
the thick portion of the bobbin includes a first thick portion supported by the large diameter portion, and a second thick portion that is disposed on an opposite side of the thin portion from the first thick portion in the axial direction and that is supported by the supporting portion, and
the small diameter portion is formed to extend in the axial direction toward the second stator from where an end of the first thick portion that is close to the second stator in the axial direction is located.

4. The linear solenoid valve according to claim 3, wherein
the small diameter portion is formed to extend in the axial direction toward the first thick portion from where an end of the first stator that is close to the second stator in the axial direction is located.

5. The linear solenoid valve according to claim 4, wherein
the supporting portion extends closer to the first stator than the core portion in the axial direction,
the small diameter portion is formed over an area including a middle position between a connection position and an end position in the axial direction,
the connection position is where a side surface of the core portion that is close to the first stator in the axial direction is connected to an inner peripheral surface of the supporting portion, and
the end position is where the end of the first thick portion that is close to the second stator in the axial direction is located.

6. The linear solenoid valve according to claim 5, further comprising:
a non-magnetic portion that is non-magnetic and that is disposed between the first stator and the second stator in the axial direction, wherein
the small diameter portion is formed all around in the circumferential direction,
the non-magnetic portion is equal in outside diameter to the small diameter portion,
the tapered portion has an inner peripheral surface and an outer peripheral surface that form a tapered shape,
the inner peripheral surface of the tapered portion is slidably contactable with an outer peripheral surface of the movable element,
the outer peripheral surface of the tapered portion is inclined so as to decrease the outside diameter of the tapered portion toward the first stator in the axial direction, and
with the movable element moved toward the first stator in the axial direction, the inner peripheral surface of the tapered portion extends in the axial direction to a location that overlaps the outer peripheral surface of the movable element as seen from the radial direction.

7. The linear solenoid valve according to claim 3, further comprising:
a non-magnetic portion that is non-magnetic and that is disposed between the first stator and the second stator in the axial direction, wherein
the small diameter portion is formed all around in the circumferential direction,
the non-magnetic portion is equal in outside diameter to the small diameter portion,
the tapered portion has an inner peripheral surface and an outer peripheral surface that form a tapered shape,
the inner peripheral surface of the tapered portion is slidably contactable with an outer peripheral surface of the movable element,
the outer peripheral surface of the tapered portion is inclined so as to decrease the outside diameter of the tapered portion toward the first stator in the axial direction, and
with the movable element moved toward the first stator in the axial direction, the inner peripheral surface of the tapered portion extends in the axial direction to a location that overlaps the outer peripheral surface of the movable element as seen from the radial direction.

8. The linear solenoid valve according to claim 4, further comprising:
a non-magnetic portion that is non-magnetic and that is disposed between the first stator and the second stator in the axial direction, wherein
the small diameter portion is formed all around in the circumferential direction,
the non-magnetic portion is equal in outside diameter to the small diameter portion,
the tapered portion has an inner peripheral surface and an outer peripheral surface that form a tapered shape,
the inner peripheral surface of the tapered portion is slidably contactable with an outer peripheral surface of the movable element,
the outer peripheral surface of the tapered portion is inclined so as to decrease the outside diameter of the tapered portion toward the first stator in the axial direction, and
with the movable element moved toward the first stator in the axial direction, the inner peripheral surface of the tapered portion extends in the axial direction to a location that overlaps the outer peripheral surface of the movable element as seen from the radial direction.

9. The linear solenoid valve according to claim 2, wherein
the supporting portion extends closer to the first stator than a core portion of the second stator in the axial direction,
the small diameter portion is formed over an area including a middle position between a connection position and an end position in the axial direction,
the connection position is where a side surface of the core portion that is close to the first stator in the axial direction is connected to an inner peripheral surface of the supporting portion, and
the end position is where an end of a first thick portion that is close to the second stator in the axial direction is located.

10. The linear solenoid valve according to claim 9, further comprising:
a non-magnetic portion that is non-magnetic and that is disposed between the first stator and the second stator in the axial direction, wherein
the small diameter portion is formed all around in the circumferential direction,
the non-magnetic portion is equal in outside diameter to the small diameter portion,
the tapered portion has an inner peripheral surface and an outer peripheral surface that form a tapered shape,
the inner peripheral surface of the tapered portion is slidably contactable with an outer peripheral surface of the movable element,
the outer peripheral surface of the tapered portion is inclined so as to decrease the outside diameter of the tapered portion toward the first stator in the axial direction, and
with the movable element moved toward the first stator in the axial direction, the inner peripheral surface of the tapered portion extends in the axial direction to a location that overlaps the outer peripheral surface of the movable element as seen from the radial direction.

* * * * *